US012403482B1

(12) United States Patent
Largey

(10) Patent No.: US 12,403,482 B1
(45) Date of Patent: Sep. 2, 2025

(54) CONTINUOUS CLEAN CENTRIFUGE

(71) Applicant: Joseph Largey, Kersey, PA (US)

(72) Inventor: Joseph Largey, Kersey, PA (US)

( * ) Notice: Subject to any disclaimer, the term of this patent is extended or adjusted under 35 U.S.C. 154(b) by 0 days.

(21) Appl. No.: 19/196,083

(22) Filed: May 1, 2025

(51) Int. Cl.
*B04B 1/14* (2006.01)
*B04B 5/00* (2006.01)
*B04B 11/04* (2006.01)
*B04B 13/00* (2006.01)

(52) U.S. Cl.
CPC .................. *B04B 1/14* (2013.01); *B04B 5/00* (2013.01); *B04B 11/04* (2013.01); *B04B 13/00* (2013.01)

(58) Field of Classification Search
CPC ...... C12M 35/04; C12M 23/16; C12M 23/42; C12M 23/48; A61K 35/28; C12N 2527/00; C12N 5/0068; A61P 17/02; B04B 5/00–5/0421; B04B 1/14; B04B 11/04
USPC .................................................. 494/16–21, 2
See application file for complete search history.

(56) References Cited

U.S. PATENT DOCUMENTS 717,385 A * 12/1902 Gathmann .............. B04B 11/02 494/60
778,355 A * 12/1904 Freas ...................... B04B 11/02 494/900
785,910 A * 3/1905 Nilsson ................... B04B 11/02 494/51
1,585,393 A * 5/1926 Laughlin ................... B04B 1/10 494/67
1,640,707 A * 8/1927 Laughlin ................... B04B 1/12 494/67
2,233,855 A * 3/1941 Suss ........................ B04B 11/02 494/56
2,849,078 A * 8/1958 Sakowski ................. B04B 5/00 494/900
3,150,944 A * 9/1964 Nerad ....................... B07B 7/08 494/900
4,425,112 A 1/1984 Ito
5,441,475 A * 8/1995 Storruste ................... B04B 1/14 494/67
5,865,719 A 2/1999 Droste et al.
5,944,648 A * 8/1999 Cornay ................... B04B 11/02 494/33

(Continued)

FOREIGN PATENT DOCUMENTS

WO WO-2019199975 A1 * 10/2019 ............... B04B 9/12

*Primary Examiner* — Charles Cooley
(74) *Attorney, Agent, or Firm* — Cramer Patent & Design, PLLC.; Aaron R. Cramer

(57) ABSTRACT

A continuous clean centrifuge is provided for separating denser materials from a flow of liquid. The device includes a manifold assembly rotatably supported within a frame assembly and driven by a motor via a belt and sprocket system. A first rotary coupler connects a manifold inlet to the source of liquid, and a second rotary coupler connects a manifold outlet to downstream usage. A plurality of valve inlets and remotely-operated release valves selectively discharge separated denser materials during operation. A main logic controller regulates motor speed between a first rotation state for separation and a second rotation state for purging, based on inputs from a programming interface, variable frequency drives, and multiple sensors. A shroud encloses the frame assembly to provide environmental protection. The centrifuge provides continuous, automated separation of denser materials from a liquid flow.

20 Claims, 6 Drawing Sheets

(56) References Cited

U.S. PATENT DOCUMENTS

| | | | | | |
|---|---|---|---|---|---|
| 6,068,587 | A * | 5/2000 | Huang | B04B 1/04 494/67 |
| 6,142,924 | A * | 11/2000 | Cornay | B04B 11/02 494/33 |
| 6,607,473 | B2 * | 8/2003 | Collier | B04B 11/02 494/4 |
| 7,189,196 | B2 * | 3/2007 | Cornay | C02F 11/086 494/84 |
| 7,241,256 | B2 * | 7/2007 | Cornay | B04B 1/00 494/51 |
| 2005/0011837 | A1 | 1/2005 | Grimwood | |
| 2010/0216623 | A1 | 8/2010 | Vastola et al. | |
| 2017/0056789 | A1 | 3/2017 | Lo | |
| 2017/0128933 | A1 | 5/2017 | Lee | |
| 2020/0188936 | A1 | 6/2020 | Rotermund | |
| 2020/0306767 | A1 | 10/2020 | Morita | |

* cited by examiner

CONTINUOUS CLEAN CENTRIFUGE

RELATED APPLICATIONS

Field of the Device

The present device relates generally to fluid filtration and separation devices, and more particularly to a continuous centrifuge system configured to separate denser materials from a flowing liquid stream through automated, programmable rotation and discharge cycles.

Background of the Device

In many industries, including water treatment, food and beverage production, oil refining, agricultural processing, and industrial fluid management, it is often necessary to remove suspended solids, particulates, and other dense contaminants from a flowing liquid. Traditional separation methods such as settling tanks, membrane filtration, and conventional centrifuges each present distinct drawbacks. Settling systems require large footprints and long processing times, while membranes are prone to clogging and require frequent cleaning or replacement. Conventional centrifuges, while effective at separating denser materials, often operate on a batch basis and require manual shutdowns to remove accumulated solids. Such interruptions reduce overall system throughput, increase labor and maintenance costs, and may expose the system to contamination risks upon reassembly.

Additionally, existing centrifuge systems generally lack flexibility to adapt to varying types of liquids and contamination profiles without significant manual intervention. Many systems offer limited control over operational parameters such as rotational speed, discharge timing, and flow pressure, making it difficult to optimize performance across different service conditions. Moreover, the need to halt operations for periodic cleaning or purging limits the feasibility of continuous flow applications where uptime is critical, such as municipal water systems, food-grade liquid production, and high-volume industrial processes.

Therefore, there exists a need in the art for an improved centrifuge system that can continuously process a flow of liquid without interruption, that can automatically separate and discharge denser materials, and that provides programmable, dynamic control of operational variables to optimize performance for a range of different fluids and use conditions. The continuous clean centrifuge of the present application fulfills these needs by providing an integrated, programmable system that separates and purges denser materials in a continuous flow environment in a highly efficient, reliable, and cost-effective manner, thereby overcoming the limitations of prior separation technologies without introducing complexity or excessive maintenance burdens.

SUMMARY OF THE DEVICE

The present device provides a continuous clean centrifuge that addresses the limitations of prior systems by enabling uninterrupted flow-through operation while automatically separating and removing denser materials. The centrifuge includes a manifold assembly rotatably supported within a frame and driven by a motor coupled via a belt and sprocket, allowing the manifold assembly to be rotated relative to the frame assembly. A main logic controller regulates the motor to operate at a first rotation state to induce centrifugal separation of denser materials from a flow of liquid and at a second rotation state to discharge the collected materials through a plurality of remotely-operated release valves positioned along the manifold. The manifold assembly is fluidly connected to a source of the liquid via a first rotary coupler and directs a cleaned liquid stream through a second rotary coupler for downstream usage. A shroud encloses the frame assembly to protect the system from environmental conditions and to reduce noise and vibration during operation.

The main logic controller interfaces with a programming interface, variable frequency drives, and a plurality of sensors to allow for either automated or manual control of the system. Operational parameters, including motor speed, discharge timing, and pump pressure, may be dynamically adjusted based on contamination levels, fluid properties, or system requirements. The continuous clean centrifuge is capable of processing a wide range of fluids, including but not limited to water, oils, sap, wines, beers, or compressed air treated as a flowable medium, and may be scaled to handle flows up to fifty million gallons per day. By allowing for continuous separation and selective purging without interruption of the flow, the system significantly improves process efficiency, reduces maintenance downtime, and provides a robust, scalable solution for industrial, agricultural, and commercial fluid processing applications.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

Figure 1:
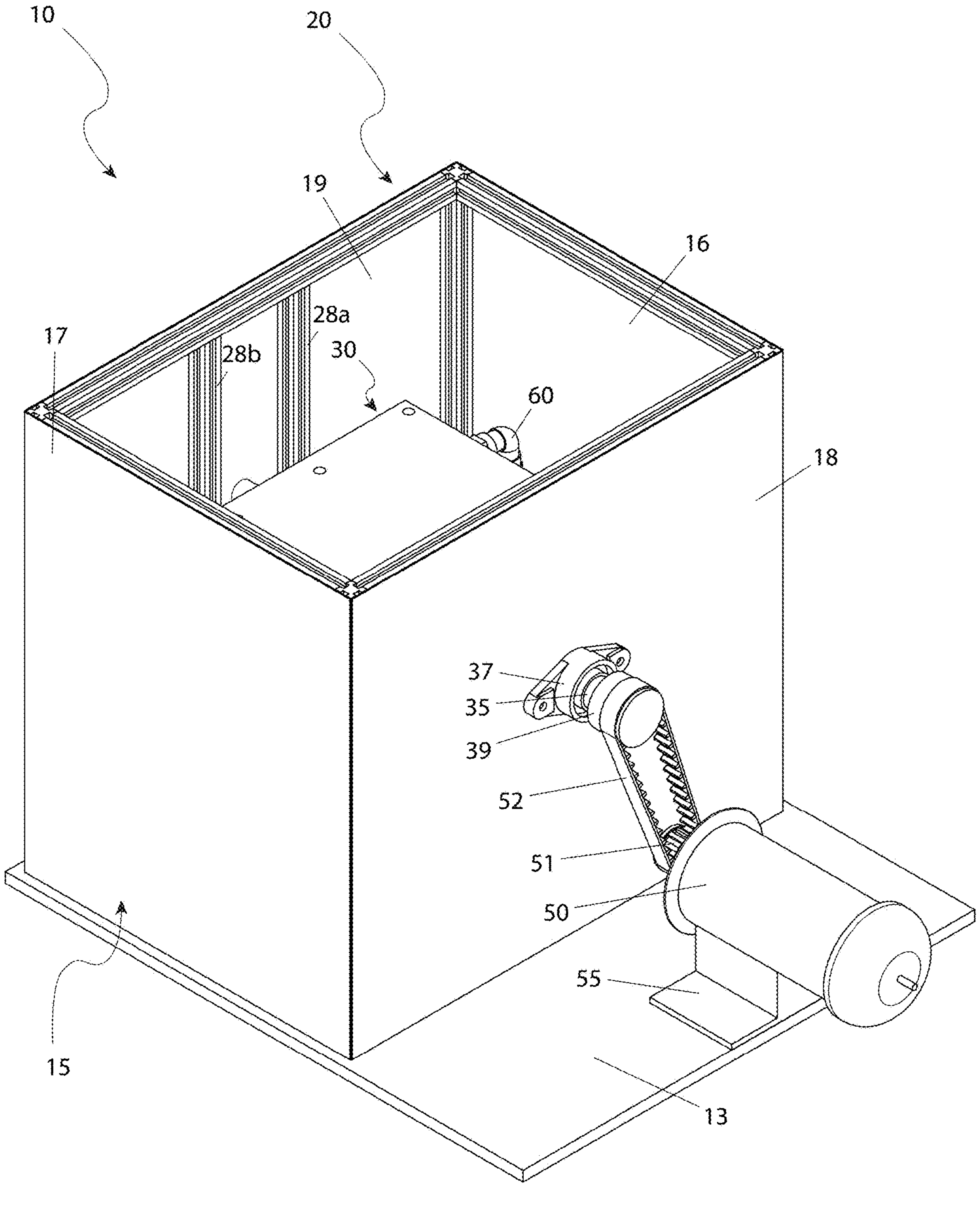
FIG. 1 is a top front second side isometric view of the continuous clean centrifuge 10, in accordance with a preferred embodiment of the present device.
Figure 7:
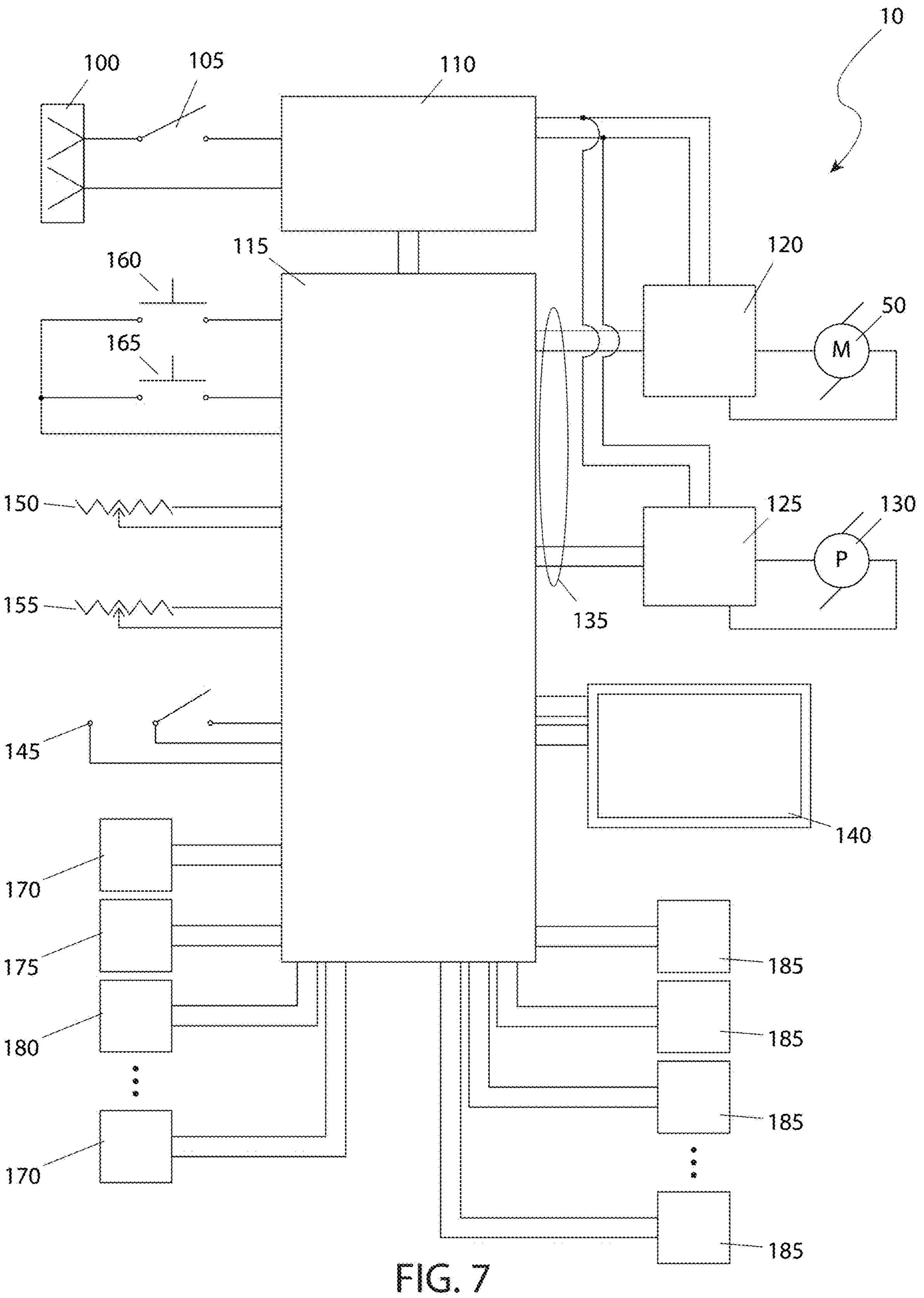

FIG. **6*a* is a pictorial view of the continuous clean centrifuge 10 operating in a first rotation state 11, wherein denser material 75 from a flow of liquid 70 collects against an outer wall of the manifold 40 and valve inlet 41**, in accordance with an exemplary method of use;

FIG. **6*b* is a pictorial view of the continuous clean centrifuge 10 operating in a second rotation state 12, wherein denser material 75 is transferred away from the manifold 40 via a remotely-operated release valve 185, in accordance with an exemplary method of use; and, FIG. 7 is an electrical schematic of a logic control for operating the continuous clean centrifuge 10**, in accordance with the preferred method of use of the present device.

DESCRIPTIVE KEY

10 continuous clean centrifuge
11 first rotation state

12 second rotation state
13 base plate
15 shroud
16 shroud front panel
17 shroud rear panel
18 shroud first side panel
19 shroud second side panel
20 frame assembly
21*a* first side upper horizontal segment
21*b* second side upper horizontal segment
22*a* front upper horizontal segment
22*b* rear upper horizontal segment
23*a* first side lower horizontal segment
23*b* second side lower horizontal segment
24*a* front lower horizontal segment
24*b* rear lower horizontal segment
25*a* first side front vertical segment
25*b* first side rear vertical segment
26*a* second side front vertical segment
26*b* second side rear vertical segment
27*a* first side front intermediate vertical segment
27*b* first side rear intermediate vertical segment
28*a* second side front intermediate vertical segment
28*b* second side rear intermediate vertical segment
30 manifold assembly
32*a* upper manifold portion
32*b* lower manifold portion
35 first rotary coupler
36 second rotary coupler
37 first bearing
38 second bearing
39 sprocket
40 manifold
41 valve inlet
42 aperture
43 manifold inlet
44 manifold outlet
50 motor
51 motor output
52 belt
55 motor mount
60 elbow
70 flow of liquid
75 denser material
100 electrical connector
105 main power switch
110 power supply
115 main logic controller
120 centrifuge motor variable frequency drive (VFD)
125 pump motor variable frequency drive (VFD)
130 pump motor
135 variable frequency drive (VFD) control signals
140 programming interface
145 auto/manual switch
150 centrifuge motor speed control
155 pump motor speed control
160 on switch
165 off switch
170 contamination sensors
175 pressure sensors
180 speed sensors
185 remotely-operated release valve

1. DESCRIPTION OF THE DEVICE

The best mode for carrying out the device is presented in terms of its preferred embodiment, herein depicted within FIGS. 1 through 7. However, the device is not limited to the described embodiment, and a person skilled in the art will appreciate that many other embodiments of the device are possible without deviating from the basic concept of the device and that any such work around will also fall under scope of this device. It is envisioned that other styles and configurations of the present device can be easily incorporated into the teachings of the present device, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

Figure 6A:
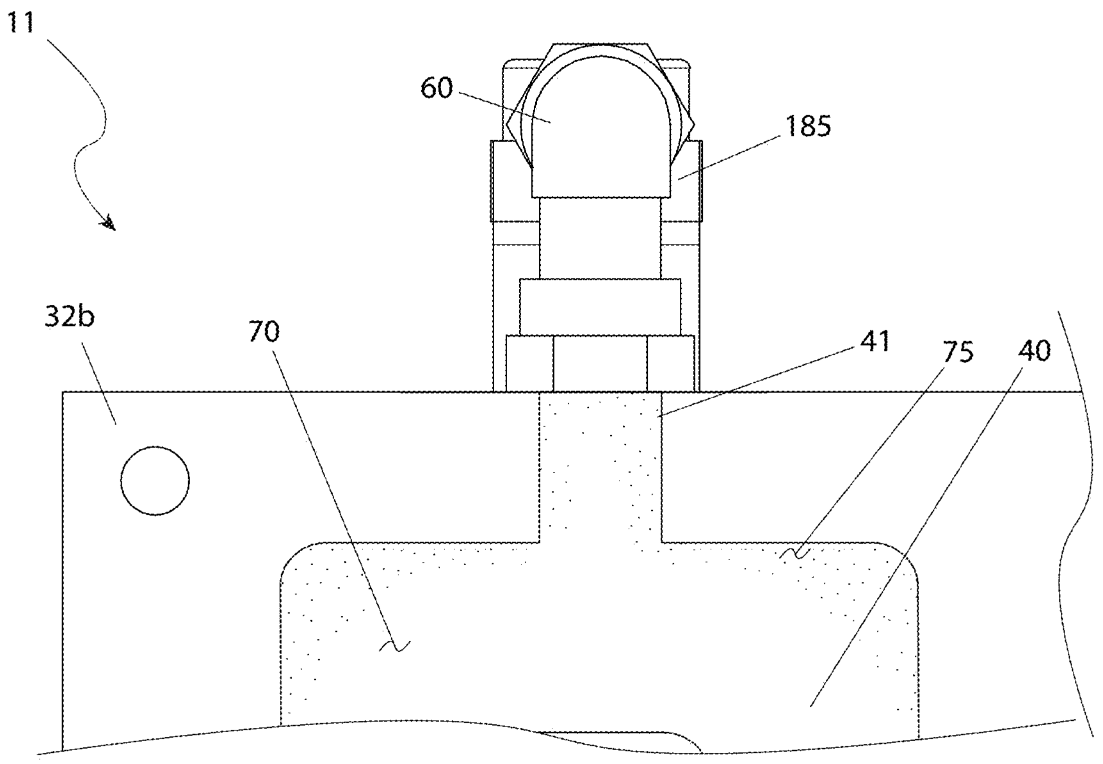
Figure 6B:
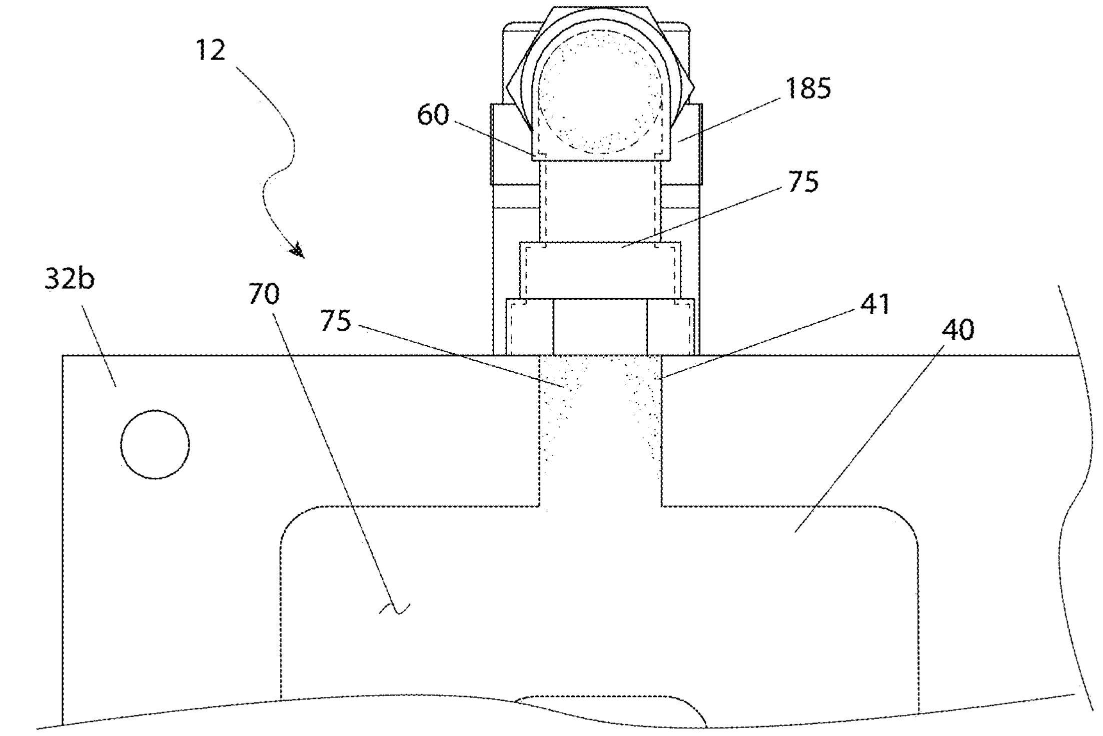

The present device describes a continuous clean centrifuge 10, which provides a cleaning means to a flow of liquid 70 passing therethrough. The continuous clean centrifuge 10 includes a manifold assembly 30 in fluid communication with a continuous flow of liquid 70 between a source of the flow of liquid 70 and downstream usage of a cleaned flow of liquid 70. The continuous clean centrifuge 10 performs the cleaning means. In an exemplary method of such a cleaning means, the continuous clean centrifuge 10 has a motor 50 that rotates the flow of liquid 70 traveling through the manifold assembly 30 at a variable rotational rate relative to a fixed frame assembly 20. This is accomplished by utilizing a logic program configured to operate and control the motor 50 generally between a faster, first rotation rate 11 and a slower, second rotation rate 12, although incremental rates are envisioned to fall under the scope of the device. At the first rotation rate 11, the continuous clean centrifuge 10 condenses denser material 75 from the flow of liquid 70 and at the second rotation rate 12, the continuous clean centrifuge 10 discharges the denser material 75. The flow of liquid 70 exiting the continuous clean centrifuge 10 is thus considerably cleaner than the flow of liquid 70 entering the continuous clean centrifuge 10. These scenarios are depicted in FIGS. 6*a*-6*b*.

The motor 50 is controlled by a main logic controller 115, which provides variable speeds thereto due to pre-programmed controls based on inputted parameters for providing the cleaning means to the flow of liquid 70. The parameters may be dependent on the type of service that the continuous clean centrifuge 10 is placed in, the relative size of the denser materials 75 desired to be filtered or otherwise removed, the rate of filtering the denser materials 75, etc. The service that the continuous clean centrifuge 10 can be placed in could include the production and handling of swimming pool water, wine, beer, sap, oil or wherever such cleaning means includes collecting and removing denser materials 75 from a flow of liquid 70 is desired or required. The continuous clean centrifuge 10 can also handle condensing and removal of water (as the denser material 75) from a flow of compressed air (the flow of liquid 70). The continuous clean centrifuge 10 may be scalable to handle up to fifty million gallons per day (50 M GPD).

FIG. 1 illustrates the continuous clean centrifuge 10, which includes a shroud 15 removably attachable to a frame assembly 20 that supports and protects the manifold assembly 30. The frame assembly 20 comprises interlocking or mutually couplable frame elements that when constructed, can provide an open-faced rectangular prism structure, capable of generally guarding the manifold assembly 30 from or to the environment during operation. The shroud 15 can include a shroud front panel 16 removably attached to a front of the frame assembly 20, a shroud rear panel 17 removably attached to a rear of the frame assembly 20, a shroud first side panel 18 removably attached to a first side of the frame assembly 20, and a shroud second side panel 19 removably attached to a second side of the frame assembly 20. Any of the shroud panels 16, 17, 18, 19 may have cut-outs to provide passage of elements of the manifold assembly 30. The shroud 15 is generally used to provide noise, vibrational, and environmental protection to the continuous clean centrifuge 10 and may be removable and shall not affect any operation thereof.

The frame assembly 20, with or without the shroud 15, can be removably or fixedly secured to a base plate 13. The motor 50 is fixedly or removably mounted to the base plate 13 with a motor mount 55 and is in mechanical communication with the manifold assembly 30 such that it can rotatably motion the manifold assembly 30 to a rotational state when activated. This can be at pre-set or pre-determined revolution per minute (rpm) settings corresponding to the first rotation state 11, the second rotation state 12, or any incremental value thereabout of the rotational rate. Such a mechanical communication can be with a belt 52 transferring power from a motor output 51 of the motor 50 to the manifold assembly 30.

Figure 2:
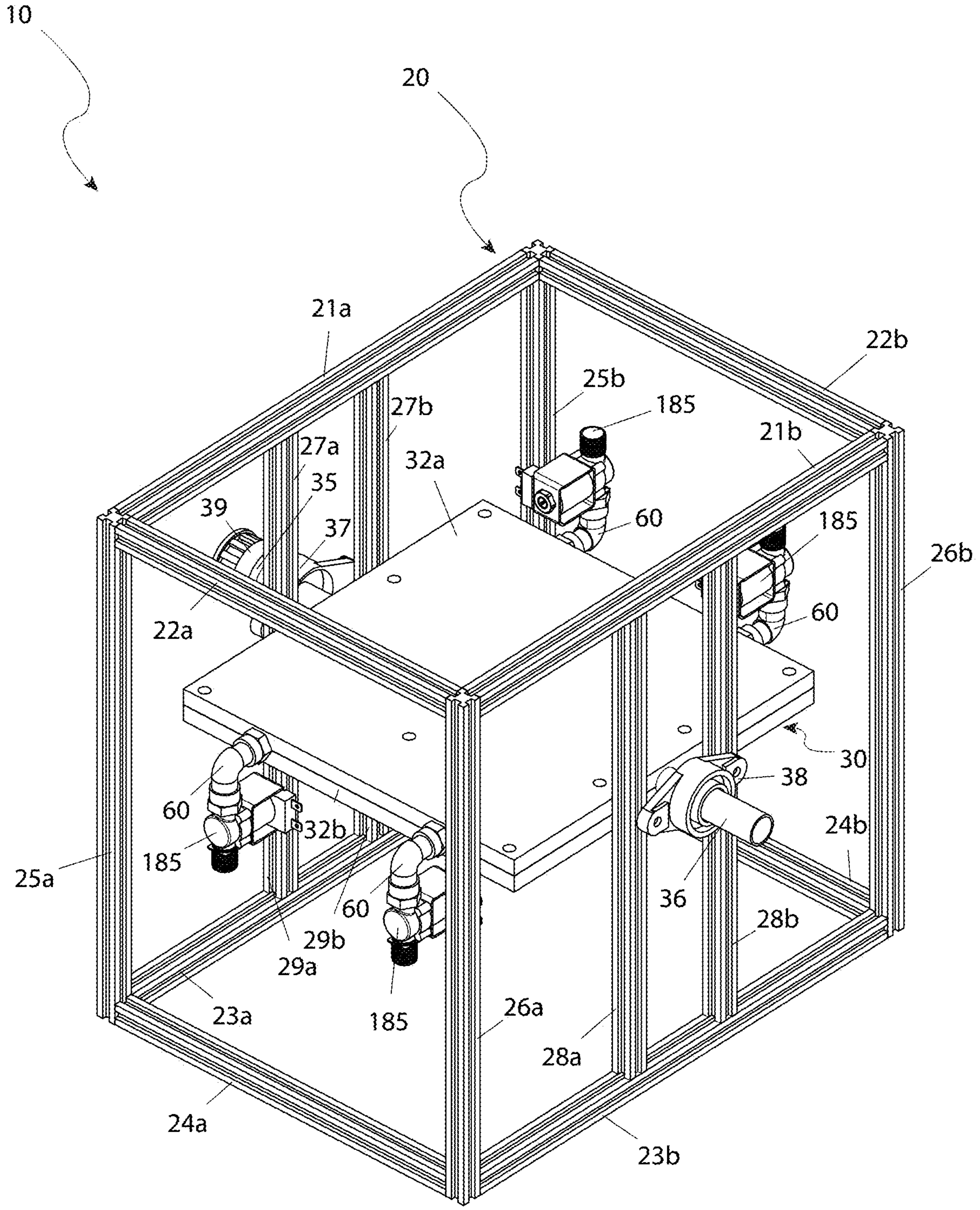
FIG. 2 is a bottom front first side isometric view of the continuous clean centrifuge 10, in accordance with the preferred embodiment of the present device.
Figure 3:
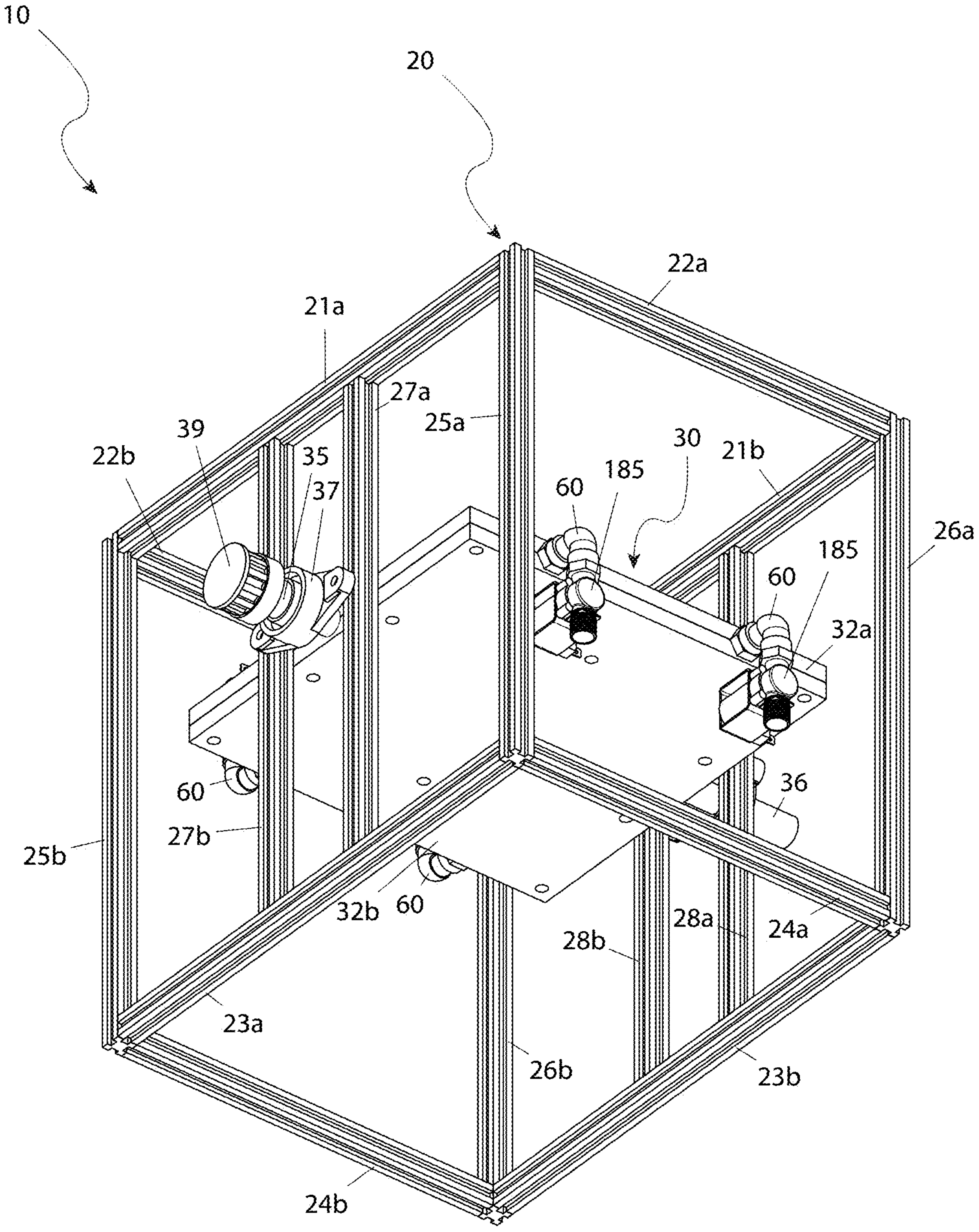
FIG. 3 is a top plan view of the continuous clean centrifuge 10, in accordance with the preferred embodiment of the present device.

Referring now to FIGS. 2-3, it can be seen in various illustrations of the continuous clean centrifuge 10 that the manifold assembly 30 is rotatably movable relative to the frame assembly 20. The frame assembly 20 further comprises a first side upper horizontal segment 21*a* and a second side upper horizontal segment 21*b* oriented parallel therewith. The first side upper horizontal segment 21*a* and second side upper horizontal segment 21*b* have a coextensive length. The frame assembly 20 also includes a front upper horizontal segment 22*a* and a rear upper horizontal segment 22*b* oriented parallel therewith. The front upper horizontal segment 22*a* and rear upper horizontal segment 22*b* have a coextensive length shorter than the first side upper horizontal segment 21*a* and second side upper horizontal segment 21*b*.

The frame assembly 20 further comprises a first side lower horizontal segment 23*a* and a second side lower horizontal segment 23*b* oriented parallel therewith. The first side lower horizontal segment 23*a* and second side lower horizontal segment 23*b* have a coextensive length. The frame assembly 20 also comprises a front lower horizontal segment 24*a* and a rear lower horizontal segment 24*b* oriented parallel therewith. The front lower horizontal segment 24*a* and rear lower horizontal segment 24*b* have a coextensive length shorter than the first side lower horizontal segment 23*a* and second side lower horizontal segment 23*b*.

A first side front vertical segment 25*a* has an upper terminal end couplable to the front terminal end of the first side upper horizontal segment 21*a* and the first side terminal end of the front upper horizontal segment 22*a*. The first side front vertical segment 25*a* has a lower terminal end couplable to the front terminal end of the first side lower horizontal segment 23*a*, and the first side terminal end of the front lower horizontal segment 24*a*. A second side front vertical segment 26*a* has an upper terminal end couplable to the front terminal end of the second side upper horizontal segment 21*b* and the second side terminal end of the front upper horizontal segment 22*a*. The second side front vertical segment 26*a* has a lower terminal end couplable to the front terminal end of the first side lower horizontal segment 23*b* and the second side terminal end of the front lower horizontal segment 24*a*. A first side rear vertical segment 25*b* has an upper terminal end couplable to the rear terminal end of the first side upper horizontal segment 21*a* and the first side terminal end of the rear upper horizontal segment 22*b*. The first side rear vertical segment 25*b* has a lower terminal end couplable to the rear terminal end of the first side lower horizontal segment 23*a* and the first side terminal end of the rear lower horizontal segment 24*b*. A second side rear vertical segment 26*b* has an upper terminal end couplable to the rear terminal end of the second side upper horizontal segment 21*b* and the second side terminal end of the rear upper horizontal segment 22*b*. The second side rear vertical segment 26*b* has a lower terminal end couplable to the rear terminal end of the second side lower horizontal segment 23*b* and the second side terminal end of the rear lower horizontal segment 24*b*.

Auxiliary frame segments are further couplable to intermediate locations about the frame assembly 20, mainly to counterbalance weight and positioning of sub-assemblies associated plumbing, logic control stations, or other environmental features. A first side front intermediate vertical segment 27*a* is attached at terminal ends to facing sides of the first side upper horizontal segment 21*a* and the first side lower horizontal segment 23*a* such that it is parallel with the first side front vertical segment 25*a* and first side rear vertical segment 25*b*. The first side front intermediate vertical segment 27*a* is located closer to the first side front vertical segment 25*a*. A first side rear intermediate vertical segment 27*b* is attached at terminal ends to facing sides of the first side upper horizontal segment 21*a* and the first side lower horizontal segment 23*a* such that it is parallel with the first side front vertical segment 25*a* and first side rear vertical segment 25*b*. The first side rear intermediate vertical segment 27*b* is located closer to the first side rear vertical segment 25*b*.

A second side front intermediate vertical segment 28*a* is attached at terminal ends to facing sides of the second side upper horizontal segment 21*b* and the second side lower horizontal segment 23*b* such that it is parallel with the second side front vertical segment 26*a* and second side rear vertical segment 26*b*. The second side front intermediate vertical segment 28*a* is located closer to the second side front vertical segment 26*a*. A second side rear intermediate vertical segment 28*b* is attached at terminal ends to facing sides of the second side upper horizontal segment 21*b* and the second side lower horizontal segment 23*b* such that it is parallel with the second side front vertical segment 26*a* and second side rear vertical segment 26*b*. The second side rear intermediate vertical segment 28*b* is located closer to the second side rear vertical segment 26*b*. The first side front intermediate vertical segment 27*a* may be aligned with the second side front intermediate vertical segment 28*a*. Similarly, the first side rear intermediate vertical segment 27*b* may be aligned with the second side rear intermediate vertical segment 28*b*.

Figure 5:
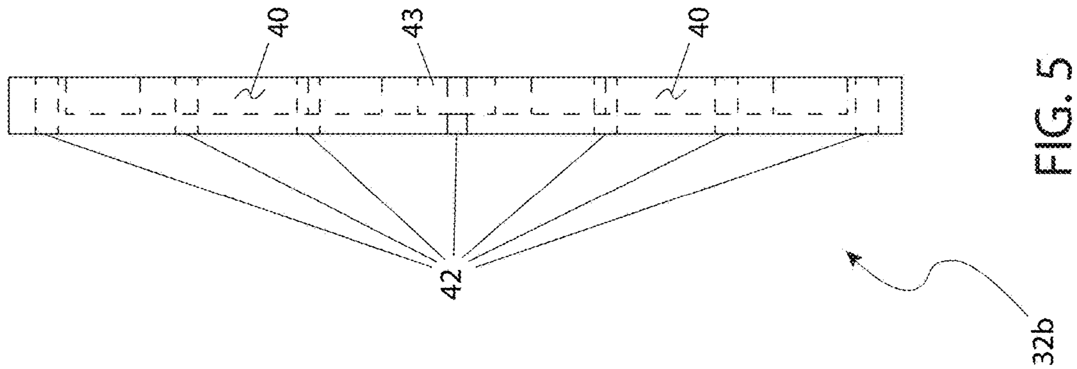
FIG. 5 is a side elevation view of the lower manifold portion **32*b* of the continuous clean centrifuge 10**, in accordance with the preferred embodiment of the present device.
Figure 4:
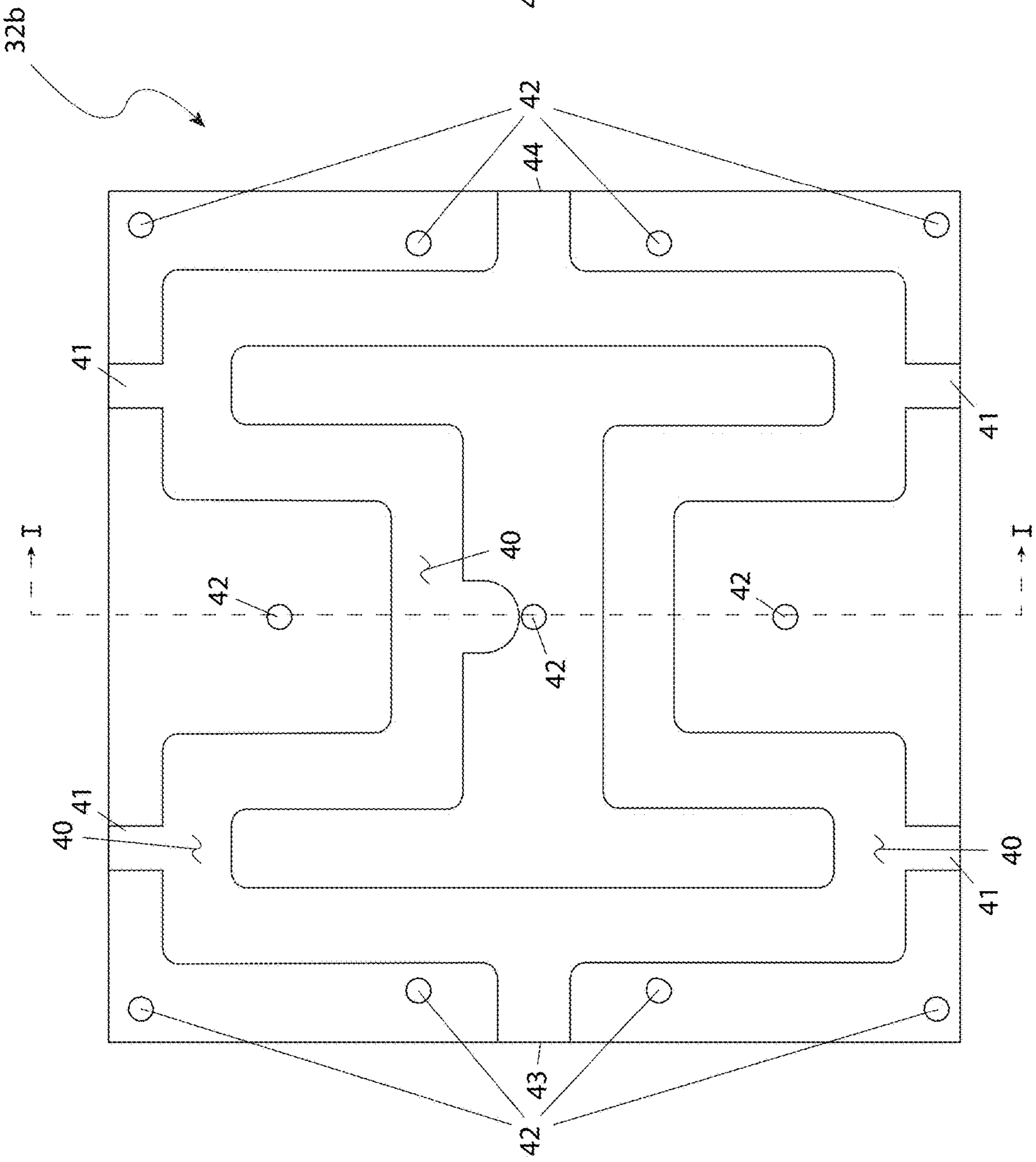
FIG. 4 is a top plan view of a lower manifold portion **32*b* of a manifold assembly 31 of the continuous clean centrifuge 10**, in accordance with the preferred embodiment of the present device.

Referring now more closely to FIGS. 4 and 5, the manifold assembly 30 can be generally seen as a rectangular element capable of independently spinning relative to the frame assembly 20. A first manifold housing 32*a* and a second manifold housing 32*b* are formed as mirror images of each other, having coextensive perimeter edges and thicknesses. FIGS. 4 and 5 illustrate the second manifold housing 32*b* but it is understood that the first manifold housing 32*a* shall be formed in the mirror image. When inner faces of the first manifold housing 32*a* and second manifold housing 32*b* are mated together, a manifold 40 and any valve inlet 41 are formed as cylindrical conduits, as well as aligned apertures 42, as well as a manifold inlet 43 and a manifold outlet 44. The manifold 40 may meander in a serpentine pathway between the manifold inlet 43 and manifold outlet 44. The manifold inlet 43 is in fluid communication with a first rotary coupler 35 and the manifold outlet 44 is in fluid communication with a second rotary coupler 46. The manifold 40 is also in fluid communication with any valve inlets 41. The valve inlets 41 are each in fluid communication with a remotely-operated release valve 185. The valve inlets 41 and remotely-operated release valves 185 are preferably positioned on opposing and aligned sides of the manifold assembly 31. In certain embodiments, plumbing in the form of elbows 60 may be in fluid communication between an individual valve inlet 41 and a respective remotely-operated release valve 185. The aligned apertures 42 provide a secondary fastening means to secure the first manifold housing 32*a* and second manifold housing 32*b* together. The first manifold housing 32*a* and second manifold housing 32*b* may be constructed out of stainless steel piping, although polycarbonate plastic or other durable and resilient material may be utilized, as well as plain stock being bored or formed in situ. In an exemplary embodiment, the overall dimensions of the manifold assembly 31 are eight inches (8 in.) in width by twelve inches (12 in.) in length and one and one-half inches (1½ in.) in thickness. When fully formed, the diameter of the manifold 40 is one inch (1 in.).

A flow of liquid 70 is introduced from a source to the first rotary coupler 35, where it is transferred to the manifold 40 through the manifold inlet 43. The cleaner flow of liquid 70 exits the manifold 40 through the manifold outlet 44 into the second rotary coupler 36 and delivered for downstream usage. Any flow of liquid 70 with denser material 75 is collected for subsequent removal via remotely-operated release valves 185. Referring now back to FIGS. 1-3, a first bearing 37 circumscribes the first rotary coupler 35 and is mounted to the first side of the frame assembly 20 and a second bearing 38 of the second rotary coupler 36 is mounted to the second side of the frame assembly 20. Specifically in the exemplary embodiment, the first bearing 37 is mounted to the first side front vertical segment 27*a* and first side rear intermediate vertical segment 27*b* and the second bearing 38 is mounted to the second side front vertical segment 28*a* and second side rear vertical segment 28*b* such that the first rotary coupler 35 is positioned external of the frame assembly 20 and the first side rear intermediate vertical segment 29*b* and the shaft outlet 36 is positioned external of the frame assembly 20. The communication between the first rotary coupler 35 and first bearing 37 and the communication between the second rotary coupler 36 and second bearing 38 enable the relative rotating motion of the manifold assembly 30 relative to the frame assembly 20. A sprocket 39 circumscribes the first rotary coupler 35 at a position outside of the frame assembly 20, preferably immediately adjacent to the motor output 51 of the motor 50. The motor 50 is in operable communication with the sprocket 39 via the belt 52 such that a rotational force generated by the motor 50, when activated, is transferred to the motor output 51, belt 52, sprocket 39 and then transferred to the first rotary coupler 35 to enable rotation of the manifold assembly 30 relative to the frame assembly 20.

When the continuous clean centrifuge 10 is placed in the first rotation state 11, as depicted in FIG. 6*a*, any denser material 75 is directed to an inner surface of outer portions of the manifold 40 (i.e., towards the perimeter edge) due to centrifugal forces acting on the flow of liquid 70. These locations are advantageously aligned with a valve inlet 41. In the first rotation state 11, the remotely-operated release valves 185 are closed. When the continuous clean centrifuge 10 is placed in the second rotation state 12, the remotely-operated release valves 185 are opened, such that a flow of liquid 70 with a very high concentration of denser material 75 can be delivered downstream for collection or treatment. The first rotary coupler 35 and second rotary coupler 36 have effective seals to seal the manifold inlet 43 and manifold outlet 44, respectively, from any flow of liquid 70 or denser material 75 from leaking into the environment.

A pump may be also mounted to the base plate 13 to be in fluid communication with the continuous clean centrifuge 10 such that it is able to deliver an amount of fluid thereto. The pump is operated by a pump motor 130 in operational and electrical communication with the main logic controller 115. The pump is designed to deliver an amount of fluid with enough pressure to overcome any increased gravitational forces produced by the motor 50 to the flow of liquid 70 within the manifold 40 of the manifold assembly 30. Any existing actuated inlet valves, actuated outlet valves, or proportioning valves may all be configured to be controlled with the main logic controller 115.

As is depicted in FIG. 7, an electrical schematic of logic control for operation of the continuous clean centrifuge 10, along with an exemplary method of use, is disclosed herein. Electrical power for the continuous clean centrifuge 10 is provided through an electrical connector 100, such as a power cord or through direct connected power. Overall power requirements would be dictated by the total power draw of the individual electrical loads added together. Power would then be routed through a main power switch 105 and onto a power supply 110. The power supply 110 would then provide power to a main logic controller 115 such as AutomationDirect Click PLC®. Other types of main logic controllers 115 including but not limited to Allen-Bradley Micro800 Series®, Siemens S7-1200®, Unitronics Unistream®, or even a Raspberry Pi® with Remote I/O, may also be utilized. The specific use of any specific type of main logic controller 115 is not intended to be a limiting factor of the present device. Power from the power supply 110 is also routed to a centrifuge motor variable frequency drive (VFD) 120 and a pump motor variable frequency drive (VFD) 125 for controlling the speed and torque characteristic of the motor 50 and a pump motor 130 via variable frequency drive (VFD) control signals 135 connected as outputs from the main logic controller 115. The centrifuge motor VFD 120 would allow for speed control of the motor 50 up to and including twenty thousand revolutions per minute (20,000 RPM), although pre-set values may be used and generally categorized as speeds corresponding to the first rotation state 11 and the second rotation state 12. Incremental speed control is also envisioned. The pump motor VFD 125 would allow for operation of the pump motor 130 within a range of forty to two hundred pounds per square inch (40-200 psi). The pump motor VFD 125 may be determined by the rotation rate of the centrifuge motor VFD 120.

The main logic controller 115 is also provided with a programming interface 140 to allow for logic programming of the continuous clean centrifuge 10 to deal with specific applications. The programming interface 140 is envisioned to be an HMI (Human-Machine Interface), or equal. The main logic controller 115 is also provided with an auto/manual switch 145 to allow either for programming via the programming interface 140 in an auto mode, or manual operation via a centrifuge motor speed control 150 and a pump motor speed control 155. On and off control is performed by an on switch 160 and an off switch 165, respectively, which also function as inputs to the main logic controller 115. The continuous clean centrifuge 10 is equipped with a multitude of other sensorial input, including but not limited to: contamination sensors 170, pressure sensors 175, and speed sensors 180. The use of any specific type or quantity of sensors is not intended to be a limiting factor of the present device. The location of the sensors 170, 175, 180 can be placed anywhere in-line with the continuous clean centrifuge 10, although locations at the manifold outlet 44, the second rotary coupler 36, or any of the remotely-operated release valves 185 may provide the most beneficial "snapshot" of the overall operation. Any and all sensors 170, 175, 180 function as input to the main logic controller 115.

Upon satisfying the requirements of the internal logic, the main logic controller 115 provides an output signal to any remotely-operated release valves 185. The remotely-operated release valves 185, in an exemplary embodiment, may be a spring-operated poppet valve. The remotely-operated release valves 185 will work with the internal logic of the main logic controller 115 and control of the centrifuge motor VFD 120 and pump motor VFD 125 to assure proper operation of the continuous clean centrifuge 10. It is noted that the remotely-operated release valves 185, envisioned to approximate four (4) units per plumbing section, may be controlled by a wide variety of methods including but not limited to: a pneumatic cylinder-operated type and an electric motor drive with a screw mechanism. The remotely-operated release valves 185 are then placed in fluid communication with downstream functions, if necessary, and convey the denser material 75. Such downstream functions may include purification, sanitation, destruction, reclamation, etc.

In another embodiment, the continuous clean centrifuge 10 consists of the base plate 13, the shroud 15 including the shroud front panel 16, shroud rear panel 17, shroud first side panel 18, and shroud second side panel 19, and the frame assembly 20 formed from the first side upper horizontal segment 21*a*, second side upper horizontal segment 21*b*, front upper horizontal segment 22*a*, rear upper horizontal segment 22*b*, first side lower horizontal segment 23*a*, second side lower horizontal segment 23*b*, front lower horizontal segment 24*a*, rear lower horizontal segment 24*b*, first side front vertical segment 25*a*, first side rear vertical segment 25*b*, second side front vertical segment 26*a*, second side rear vertical segment 26*b*, first side front intermediate vertical segment 27*a*, first side rear intermediate vertical segment 27*b*, second side front intermediate vertical segment 28*a*, and second side rear intermediate vertical segment 28*b*. The frame assembly 20 supports a manifold assembly 30 consisting of an upper manifold portion 32*a* and a lower manifold portion 32*b* joined together to form a manifold 40 having one or more valve inlets 41 positioned along its periphery, a manifold inlet 43, a manifold outlet 44, and a plurality of apertures 42 for alignment and fastening. The manifold inlet 43 is in fluid communication with a first rotary coupler 35, and the manifold outlet 44 is in fluid communication with a second rotary coupler 36, with both couplers supported rotatably by a first bearing 37 and a second bearing 38, respectively, mounted to the frame assembly 20. A sprocket 39 is affixed to the first rotary coupler 35 outside the frame assembly 20 and receives rotational input from a motor output 51 of a motor 50 via a belt 52, with the motor 50 mounted to the base plate 13 by a motor mount 55, thereby imparting rotation to the manifold assembly 30 relative to the frame assembly 20. The manifold 40 internally conveys a flow of liquid 70 introduced through the first rotary coupler 35 and manifold inlet 43 and directs the flow through the manifold 40 towards the manifold outlet 44 and second rotary coupler 36 for downstream use. Denser material 75 separated from the flow of liquid 70 during rotation is directed toward valve inlets 41 aligned with remotely-operated release valves 185, with optional elbows 60 connecting the valve inlets 41 to the release valves 185 to facilitate the removal of collected denser material 75 during operation in the second rotation state 12. The continuous clean centrifuge 10 is electrically powered through an electrical connector 100 connected to a main power switch 105 and a power supply 110, which distributes power to a main logic controller 115, a centrifuge motor variable frequency drive (VFD) 120 controlling the motor 50, and a pump motor variable frequency drive (VFD) 125 controlling a pump motor 130 for pressurizing the incoming flow of liquid 70. Variable frequency drive control signals 135 from the main logic controller 115 regulate the operation of the centrifuge motor VFD 120 and the pump motor VFD 125, permitting fine speed and pressure adjustments according to programmed parameters. A programming interface 140 permits the main logic controller 115 to be configured for either automatic or manual operation, selectable via an auto/manual switch 145. Manual adjustments are performed through a centrifuge motor speed control 150 and a pump motor speed control 155, while an on switch 160 and off switch 165 allow for basic power control. Sensor arrays, including contamination sensors 170, pressure sensors 175, and speed sensors 180, are installed in-line at key locations such as the manifold outlet 44, second rotary coupler 36, and release valves 185 to provide real-time operational feedback to the main logic controller 115. In response to programmed conditions and sensor inputs, the main logic controller 115 governs the operation of the remotely-operated release valves 185 to selectively evacuate accumulated denser material 75, thus maintaining a continuous cleaning operation. All of the foregoing mechanical, fluid, and electrical communications among the respective numbered components work cooperatively within the continuous clean centrifuge 10 to provide an integrated system capable of operating through the first rotation state 11 for separation and the second rotation state 12 for purging.

The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A continuous clean centrifuge, comprising:

a frame assembly;

a base plate coupled to the frame assembly;

a manifold assembly rotatably mounted within the frame assembly;

a motor mounted to the base plate and operatively connected to the manifold assembly to rotate the manifold assembly;

a first rotary coupler positioned at a first end of the manifold assembly and coupled to a manifold inlet;

a second rotary coupler positioned at a second end of the manifold assembly and coupled to a manifold outlet;

a belt operatively connecting a motor output of the motor to a sprocket mounted on the first rotary coupler;

a main logic controller configured to control operation of the motor;

a plurality of valve inlets in fluid communication with a manifold formed in the manifold assembly; and, a plurality of remotely-operated release valves each fluidly connected to a respective valve inlet; and, wherein the motor rotates the manifold assembly at a first rotation state and a second rotation state;

wherein at the first rotation state, denser material separates from a flow of liquid traveling through the manifold and accumulates adjacent the valve inlets; and, wherein at the second rotation state, the remotely-operated release valves are opened to discharge the denser material from the manifold assembly.

2. The continuous clean centrifuge of claim 1, wherein the frame assembly comprises a plurality of upper horizontal segments, lower horizontal segments, vertical segments, and intermediate vertical segments forming a generally rectangular prism.

3. The continuous clean centrifuge of claim 2, wherein the frame assembly includes a first side upper horizontal segment, a second side upper horizontal segment, a front upper horizontal segment, and a rear upper horizontal segment.

4. The continuous clean centrifuge of claim 2, wherein the frame assembly further includes a first side lower horizontal segment, a second side lower horizontal segment, a front lower horizontal segment, and a rear lower horizontal segment.

5. The continuous clean centrifuge of claim 2, wherein the frame assembly includes a first side front vertical segment, a first side rear vertical segment, a second side front vertical segment, and a second side rear vertical segment.

6. The continuous clean centrifuge of claim 2, wherein the frame assembly further includes a first side front intermediate vertical segment, a first side rear intermediate vertical segment, a second side front intermediate vertical segment, and a second side rear intermediate vertical segment.

7. The continuous clean centrifuge of claim 1, wherein the manifold assembly comprises an upper manifold portion and a lower manifold portion, the upper and lower manifold portions mating together to form the manifold, the valve inlets, the manifold inlet, and the manifold outlet.

8. The continuous clean centrifuge of claim 1, wherein a first bearing circumscribes the first rotary coupler and a second bearing circumscribes the second rotary coupler, each bearing being mounted to the frame assembly.

9. The continuous clean centrifuge of claim 1, wherein the motor is controlled by a centrifuge motor variable frequency drive (VFD) configured to adjust the rotational speed of the motor between the first rotation state and the second rotation state.

10. The continuous clean centrifuge of claim 1, wherein the main logic controller is configured to receive input from a programming interface allowing operation in either an automatic mode or a manual mode.

11. The continuous clean centrifuge of claim 10, wherein the automatic mode adjusts motor speed based on parameters selected at the programming interface.

12. The continuous clean centrifuge of claim 10, wherein the manual mode allows user control of the motor speed using a centrifuge motor speed control.

13. The continuous clean centrifuge of claim 1, further comprising a shroud removably attached to the frame assembly, the shroud including a shroud front panel, a shroud rear panel, a shroud first side panel, and a shroud second side panel.

14. The continuous clean centrifuge of claim 1, wherein the manifold is formed with a serpentine pathway between the manifold inlet and the manifold outlet.

15. The continuous clean centrifuge of claim 1, further comprising elbows connecting the valve inlets to the remotely-operated release valves.

16. The continuous clean centrifuge of claim 1, wherein each remotely-operated release valve is a spring-operated poppet valve.

17. The continuous clean centrifuge of claim 1, further comprising a pump mounted to the base plate and configured to deliver the flow of liquid into the first rotary coupler.

18. The continuous clean centrifuge of claim 17, wherein the pump is operated by a pump motor controlled by a pump motor variable frequency drive (VFD) regulated by the main logic controller.

19. The continuous clean centrifuge of claim 1, further comprising a plurality of sensors selected from the group consisting of contamination sensors, pressure sensors, and speed sensors, wherein the sensors are in communication with the main logic controller.

20. The continuous clean centrifuge of claim 19, wherein the main logic controller controls the actuation of the remotely-operated release valves based on data received from the sensors.

* * * * *